US009723307B2

(12) United States Patent
Jung et al.

(10) Patent No.: US 9,723,307 B2
(45) Date of Patent: Aug. 1, 2017

(54) ESTIMATION OF MOTION AT THE LEVEL OF THE DECODER BY MATCHING OF MODELS

(71) Applicant: Orange, Paris (FR)

(72) Inventors: Joel Jung, Le Mesnil Saint-Denis (FR); Jean Marc Thiesse, Saint-Cloud (FR)

(73) Assignee: Orange, Paris (FR)

( * ) Notice: Subject to any disclaimer, the term of this patent is extended or adjusted under 35 U.S.C. 154(b) by 431 days.

(21) Appl. No.: 14/348,780

(22) PCT Filed: Sep. 20, 2012

(86) PCT No.: PCT/FR2012/052103
§ 371 (c)(1),
(2) Date: Mar. 31, 2014

(87) PCT Pub. No.: WO2013/045794
PCT Pub. Date: Apr. 4, 2013

(65) Prior Publication Data
US 2014/0233655 A1    Aug. 21, 2014

(30) Foreign Application Priority Data

Sep. 30, 2011 (FR) ..................................... 11 58864

(51) Int. Cl.
*H04N 19/51*      (2014.01)
*H04N 19/597*     (2014.01)
(Continued)

(52) U.S. Cl.
CPC ..... *H04N 19/00587* (2013.01); *H04N 19/105* (2014.11); *H04N 19/147* (2014.11);
(Continued)

(58) Field of Classification Search
CPC .......... H04N 19/00587; H04N 19/597; H04N 19/105; H04N 19/44; H04N 19/147; H04N 19/51; H04N 19/192; H04N 19/176
(Continued)

(56) References Cited

U.S. PATENT DOCUMENTS 7,295,614 B1 * 11/2007 Shen .................... H04N 19/147
375/240.25
2010/0266046 A1   10/2010 Jung et al.
(Continued)

FOREIGN PATENT DOCUMENTS

CN    WO 2012045225 A1 *  4/2012 ............. H04N 19/56
WO        2009071803 A1     6/2009
(Continued)

OTHER PUBLICATIONS

International Preliminary Report on Patentability and English translation of the Written Opinion dated Apr. 1, 2014 for corresponding International Application No. PCT/FR2012/052103 filed Sep. 20, 2012.
(Continued)

*Primary Examiner* — Zhihan Zhou
(74) *Attorney, Agent, or Firm* — David D. Brush; Westman, Champlin & Koehler, P.A.

(57) ABSTRACT

Methods and apparatus are provided for decoding and coding a data signal representing at least one current image split up into partitions. The method of decoding includes, for at least one current partition to be reconstructed in the image, steps of: prediction of the current partition from at least one already decoded causal partition, and reconstruction of the current partition, from the predicted current partition, delivering a reconstructed current partition. Following the aid reconstruction step, the decoding method
(Continued)

implements steps of: determination of at least one already decoded causal partition using a motion estimation applied to the reconstructed current partition, and modification of the reconstructed current partition by calculation of a function applied both to the determined causal partition and to the reconstructed current partition, delivering a modified reconstructed current partition.

10 Claims, 7 Drawing Sheets

(51) Int. Cl.
*H04N 19/105* (2014.01)
*H04N 19/176* (2014.01)
*H04N 19/147* (2014.01)
*H04N 19/192* (2014.01)
*H04N 19/44* (2014.01)

(52) U.S. Cl.
CPC ......... *H04N 19/176* (2014.11); *H04N 19/192* (2014.11); *H04N 19/44* (2014.11); *H04N 19/51* (2014.11); *H04N 19/597* (2014.11)

(58) Field of Classification Search
USPC .................................................. 375/240.16
See application file for complete search history.

(56) References Cited

U.S. PATENT DOCUMENTS

| | | | | |
|---|---|---|---|---|
| 2011/0249748 | A1* | 10/2011 | Zan | H04N 19/105 375/240.16 |
| 2012/0294370 | A1* | 11/2012 | Chiu | H04N 19/56 375/240.16 |
| 2013/0121416 | A1* | 5/2013 | He | H04N 19/00642 375/240.14 |
| 2014/0146890 | A1* | 5/2014 | Chiu | H04N 19/00684 375/240.16 |

FOREIGN PATENT DOCUMENTS

| | | | | |
|---|---|---|---|---|
| WO | WO 2012012582 | A1 * | 1/2012 | ....... H04N 19/00642 |
| WO | WO 2012083487 | A1 * | 6/2012 | ....... H04N 19/00684 |

OTHER PUBLICATIONS

International Search Report and Written Opinion dated Nov. 15, 2012 for corresponding International Application No. PCT/FR2012/052103, filed Sep. 20, 2012.

Ueda M. et al., "TE1: Refinement Motion Compensation Using Decoder-Side Motion Estimation", 2. JCT-VC Meeting Jul. 21, 2010-Jul. 28, 2010; Geneva; Joint Collaborative Team on Video Coding of ISO/IEC JTC1/SC29/WG11 and ITU-T SG. 16); URL: http://wftp3.itu.int/av-arch/jctvc-sit e/,, No. JCTVC-B032 Jul. 18, 2010, XP030007612.

Y-W Huang et al., "TE1: Decoder-Side Motion Vector Derivation with Switchable Template Matching", 2. JCT-VC Meeting; Jul. 21, 2010-Jul. 28, 2010; Geneva; (Joint Collaborative Team on Video Coding of ISO/IEC JTC1/SC29/WG11 and ITU-T SG. 16); URL: http://wftp3.itu.int/av-arch/jctvc-sit e/,, No. JCTVC-B076, Jul. 23, 2010, XP030007656.

Kamp S. et al., "Multihypothesis Prediction Using Decoder Side-Motion Vector Derivation in Inter-frame Video Coding", Visual Communications and Image Processing; Jan. 20, 2009-Jan. 22, 2009; San Jose, Jan. 20, 2009, XP030081712.

Kamp S. et al., "Improving AVC Compression Performance by Template Matching with Decoder-Side Motion Vector Derivation", 84. MPEG Meeting; Apr. 28, 2008-May 2, 2008; ARCHAMPS; Motion Picture Expert Group or ISO/IEC JTC1/SC29/WG11, , No. M15375, Apr. 25, 2008, XP030043972.

Shinya Shimizu et al., "Improved View Synthesis Prediction Using Decoder-Side Motion Derivation for Multiview Video Coding" 3DTV—conference: The True Vision—Capture, Transmission and Display of 3D Video (3DTV-CON, 2010, IEEE, Piscataway, NJ, USA, Jun. 7, 2010, pp. 1-4, XP031706545.

* cited by examiner

ESTIMATION OF MOTION AT THE LEVEL OF THE DECODER BY MATCHING OF MODELS

CROSS-REFERENCE TO RELATED APPLICATION

This Application is a Section 371 National Stage Application of International Application No. PCT/FR2012/052103, filed Sep. 20, 2012, which is incorporated by reference in its entirety and published as WO 2013/045794 on Apr. 4, 2013, not in English.

FIELD OF THE INVENTION

The present invention pertains generally to the field of image processing, and more precisely to the coding and decoding of digital images and of digital image sequences.

More precisely, the invention applies to the compression of images or video sequences using a block-wise representation of the video sequence.

The invention can be applied especially, but not exclusively, to the video coding implemented in current video coders and their amendments (MPEG, H.264, H.264 SVC, H.264 MVC, etc.) or to forthcoming video coders (HEVC/H265), and to the corresponding decoding.

PRIOR ART

Digital images and image sequences occupy a great deal of space in terms of memory, thus making it necessary, when these images are transmitted, to compress them so as to avoid problems of crowding on the communication network used for this transmission, the bitrate usable thereon generally being limited. This compression is also desirable with a view to the storage of these data.

Numerous video data compression techniques are already known. Among them, numerous video coding techniques, especially the H.264 technique, use techniques of spatial or temporal prediction of groups of blocks of pixels of a current image with respect to other groups of blocks of pixels belonging to the same image or to a preceding or following image.

More precisely, according to the H.264 technique, I images are coded by spatial prediction (intra prediction), and P and B images are coded by temporal prediction (inter prediction) with respect to other coded/decoded I, P or B images using a motion compensation.

Such images are generally split up into macroblocks, themselves split up into partitions comprising a set of pixels (for example 8×8 pixels). For each partition a residual partition, also called a prediction residual, corresponding to the original partition minus a prediction, is coded. After this predictive coding, the residual partitions are transformed by a transform of discrete cosine transform (DCT) type, and then quantized. The coefficients of the quantized residual partitions are thereafter scanned in an order of reading making it possible to utilize the substantial number of zero coefficients in the high frequencies, and then coded by entropy coding.

In accordance with the invention, a partition can consist of a block of generally square or rectangular shape, or else have other shapes, such as a linear shape, an L-shape, etc.

According to the H.264 technique for example, when a macroblock is split up into blocks, a data signal, corresponding to each block, is transmitted to the decoder. Such a signal comprises:

residual data which are the coefficients of the quantized residual blocks and optionally, during a coding in Inter mode, residual data of the motion vectors, coding parameters representing the mode of coding used, in particular:

the mode of prediction (intra prediction, inter prediction, default prediction carrying out a prediction for which no information item is transmitted to the decoder (known as "skip"));

information items specifying the type of prediction (orientation, reference image, . . . );

the type of partitioning;

the type of transform, for example 4×4 DCT, 8×8 DCT, etc. . . .

the motion information items if necessary;

etc.

The decoding is done image by image, and for each image, macroblock by macroblock. For each partition of a macroblock, the corresponding elements of the signal are read. The inverse quantization and the inverse transformation of the coefficients of the partitions are performed. Next, the prediction of the partition is calculated and the partition is reconstructed by adding the prediction to the decoded prediction residual.

Competition-based intra or inter coding, such as implemented in the H.264 standard, thus relies on placing various coding parameters, such as the aforementioned, in competition with the aim of selecting the best coding mode, that is to say that which will optimize the coding of the partition considered according to a predetermined performance criterion, for example the bitrate/distortion cost, well known to the person skilled in the art.

The coding parameters relating to the selected mode of coding are contained in the data signal transmitted by the coder to the decoder, in the form of identifiers generally called competition indices. The decoder is thus capable of identifying the mode of coding selected at the coder, and then of applying the prediction in accordance with this mode.

Several solutions have been proposed that attempt to reduce the signaling cost of such indices.

For example, in document WO 2009/071803, it is proposed, in the case where the coding is performed using an Inter mode of prediction, to reproduce at the decoder the motion prediction that is employed at the coder. Thus, motion predictors, such as motion vectors for example, do not need to be transmitted by the coder to the decoder.

When coding a current partition using the aforementioned mode, it is generally proposed to select by competition at least one motion vector predictor using the technique of "template matching". This technique is then implemented at the decoder, in the aim of not transmitting in the coded stream items of motion information with a high signaling cost. The "template matching" technique consists in comparing the intensity of the pixels of the current partition with the intensity of the pixels in one or more already coded then decoded causal partitions, in selecting the motion vector pointing toward the causal partition whose pixel intensity is the closest to the pixel intensity of the current partition, then in predicting the motion vector thus selected. One drawback of this technique is that the pairing performed between the current partition and the selected causal partition is limited to a comparison of the intensity of the pixels and does not take into account an inequality in size or in shape for example, which could exist between the current partition to be coded (or decoded respectively) and the causal partition. Furthermore, the causal partitions placed in competition according to this technique are always those situated in certain directions predetermined with respect to the current partition to be coded, that is to say generally above and to the left of the current partition. The result is an imprecise prediction of the current partition which leads to non-negligible errors during coding/decoding of the current partition. In most cases, due to the fact that this technique alters the precision of the motion prediction, it is necessary, in order to compensate for this precision defect, to transmit to the decoder residual texture data which are very expensive in terms of bitrate.

In the article by M. Ueda, S. Fukushima: *TE1: Refinement Motion Compensation using Decoder-side Motion Estimation*, JCTVC-B032, Geneva, July 2010, more particularly with reference to FIGS. 1 and 2 of the latter, it is proposed to carry out at the coder a first motion prediction of one block, then to refine the motion-compensated block obtained at the outcome of said first prediction, by means of a second motion prediction implemented at the decoder. Such a motion-refined block is called an RMC block (from the term Refinement Motion Compensation). This second motion estimation is performed by selecting, as a target, said motion-compensated block (Uni-Predictive MC block) which was signaled in the stream transmitted to the decoder.

Although this technique makes it possible to reduce the signaling cost of the motion information, the first motion estimation performed at the coder is not always optimal, which of necessity degrades the second motion estimation performed at the decoder, which estimation depends on the result of this first motion estimation. The result is that the RMC block obtained at the decoder is not sufficiently correlated in terms of texture and motion.

SUBJECT AND SUMMARY OF THE INVENTION

An exemplary aspect of the present invention relates to a method for decoding a data signal representing at least one current image split up into partitions, such a method comprising, for at least one current partition to be reconstructed in said image, the steps of:
  prediction of the current partition from at least one already decoded causal partition,
  reconstruction of the current partition from the predicted current partition, delivering a reconstructed current partition.

Such a decoding method is noteworthy in that it implements, following the aforementioned reconstruction step, the steps of:
  determination of at least one already decoded causal partition using a motion estimation applied to the reconstructed current partition,
  modification of the reconstructed current partition by calculation of a function applied both to the determined causal partition and to the reconstructed current partition, delivering a modified reconstructed current partition.

The reconstructed partition to which the motion estimation is applied has undergone a reconstruction in accordance with a given mode of prediction and using any possible residual texture data. According to the invention, the mode of prediction is either read in the coded data signal, or determined at the decoder. The latter alternative offers the advantage of reducing the signaling cost.

The reconstructed partition thus obtained at the outcome of said prediction is advantageously "refined" by implementation of a motion estimation making it possible to determine a causal partition that is the most similar possible to the reconstructed partition in terms of texture. The motion estimation applied to the reconstructed partition consists for example in the calculation of a motion vector that describes the motion between the reconstructed partition and the determined causal partition. This causal partition being used to "refine" the reconstructed partition, a reconstructed partition is obtained in a more efficient and more precise manner than in the aforementioned prior art, furthermore necessitating a minimal number of residual data.

According to a particular embodiment, the aforementioned function is applied to all the pixels of the determined causal partition or else to a sub-set of these pixels, as well as respectively to all the corresponding pixels of the reconstructed current partition or else to a corresponding sub-set of these pixels.

Such an arrangement makes it possible to optimize the precision of the refinement of the reconstructed partition, since according to a first alternative all the pixels of the determined causal partition and all the corresponding pixels of the reconstructed partition are considered. Moreover, according to the second alternative, the fact of having to consider only one sub-set of pixels at a time for the determined causal partition and the reconstructed partition makes it possible to reduce the processing time at the decoder for performing the comparison between the determined causal partition and the reconstructed current partition, while nevertheless maintaining a high degree of precision in the refinement of the reconstructed current partition. This second alternative moreover makes it possible to uniquely refine carefully chosen regions, while still retaining the pixels reconstructed with the initial prediction in the remaining regions.

According to another particular embodiment, the determined causal partition is sought in a decoded part of the current image or else in another image having already been decoded.

Such an arrangement thus makes it possible to implement the invention in the context of the decoding of a two-dimensional image using either an Intra or Inter mode of prediction.

As a variant of this other embodiment, the other already decoded image is an earlier or later image than the current image.

Such an arrangement thus makes it possible to implement the invention in the context of the decoding of a two-dimensional image using either a uni-predictive or bi-predictive scheme.

According to yet another particular embodiment, in the case where the current image comprises a plurality of views representing one and the same scene respectively, the determined causal partition is sought in an already decoded view of the current image or in another already decoded image.

Such an arrangement thus makes it possible to implement the invention in the context of the decoding of a three-dimensional image that has been coded for example in accordance with the MVC (Multiview Video Coding) standard.

The present invention also relates to a method for coding at least one image split up into partitions, implementing, for a current partition to be coded, the steps of:
  prediction of the current partition from at least one already coded then decoded causal partition,
  reconstruction of the current partition from the predicted current partition, delivering a reconstructed current partition.

Such a coding method is noteworthy in that it implements, following the reconstruction step, the steps of:
- determination of at least one already coded then decoded causal partition using a motion estimation applied to the reconstructed current partition,
- modification of the reconstructed current partition by calculation of a function applied both to the determined causal partition and to said reconstructed current partition, delivering a modified reconstructed current partition.

Said coding method offers the same advantages as the aforementioned decoding method.

According to a particular embodiment, a set of residual data being obtained following the prediction step by comparison of data relating to the current partition and to the predicted partition, the method implements, after delivering the modified reconstructed current partition, the following steps:
- modification of at least one of the residual data of the aforementioned set, delivering a modified set of residual data,
- reconstruction of the current partition from the predicted current partition and from the modified set of residual data, delivering a new reconstructed current partition,
- determination of at least one new already coded then decoded causal partition using a motion estimation applied to the new reconstructed current partition,
- modification of the new reconstructed current partition by calculation of a function applied both to the new determined causal partition and to the new reconstructed current partition, delivering a new modified reconstructed current partition,
- comparison, according to a predetermined similarity criteria, between at least two partitions chosen from among the determined causal partition, the new determined causal partition, the current partition, the modified reconstructed current partition, and the new reconstructed modified current partition.

The modification contributed to at least one of the residual data of the aforementioned set makes it possible to generate at the coding a controlled degradation of the signal to be transmitted to the decoder, to avoid including in the signal sent toward the decoder all the residual data coming from the prediction or, at the very least, all the residual data at their highest initial value. The result is a significant reduction in the signaling cost. Furthermore, the iteration of the characteristic steps of the aforementioned coding method on the basis of a modified set of residual data makes it possible to ensure that the modification performed is not penalizing in terms of reconstruction quality. It is thus possible to choose the best non-penalizing modification.

According to another particular embodiment, following the aforementioned comparison step, the coding method implements the following steps:
- at least one iteration of the steps of modification of at least one of said residual data, of reconstruction of the current partition, of determination of at least one new causal partition, of modification of a new reconstructed partition, and of comparison of partitions,
- selection of a plurality of partitions that best meet the criterion of similarity,
- choice of a partition from among the plurality of selected partitions, according to a predetermined criterion of coding performance.

Such an arrangement makes it possible to optimize signaling cost reduction, without for all that degrading the quality of the reconstruction of the image.

The invention also relates to a device for decoding a data signal representing at least one image split up into partitions, comprising, for at least one current partition to be reconstructed in the image:
- means for predicting the current partition from at least one already decoded causal partition,
- means for reconstructing the current partition, from the predicted current partition, delivering a reconstructed current partition, The decoding device is noteworthy in that it comprises:
- means for determining at least one already decoded causal partition using a motion estimation applied to the reconstructed current partition,
- means for modifying the reconstructed current partition by calculation of a function applied both to the determined causal partition and to the reconstructed current partition, delivering a modified reconstructed current partition.

The invention also relates to a device for coding at least one image split up into partitions, comprising, for a current partition to be coded:
- means for predicting the current partition from at least one already coded then decoded causal partition,
- means for reconstructing the current partition from said predicted current partition, delivering a reconstructed current partition.

Such a coding device is noteworthy in that it comprises:
- means for determining at least one already coded then decoded causal partition using a motion estimation applied to the reconstructed current partition,
- means for modifying the reconstructed current partition by calculation of a function applied both to the determined causal partition and to the reconstructed current partition, delivering a modified reconstructed current partition.

According to a particular embodiment, the coding device furthermore comprises:
- means for comparing data relating to the current partition to be coded and to the predicted partition, so as to determine a set of residual data,
- means for modifying at least one of the residual data of the set, delivering a modified set of residual data,
- the aforementioned reconstruction means being activated to reconstruct the current partition from the predicted current partition and from the modified set of residual data, delivering a new reconstructed current partition,
- the determination means being activated to determine at least one new already coded then decoded causal partition using a motion estimation applied to the new reconstructed current partition,
- the means for modifying the reconstructed current partition being activated to modify the new reconstructed current partition by calculation of a function applied both to the new determined causal partition, delivering a new modified reconstructed current partition,
- comparison means suitable for comparing at least two partitions with each other, according to a predetermined criterion of similarity, the partitions being chosen from among the determined causal partition, the new determined casual partition, the current partition, the modified reconstructed current partition, and the new modified reconstructed current partition.

The invention also relates to a computer program including instructions for implementing the method for coding or the method for decoding according to the invention, when it is executed on a computer.

This program can use any programming language, and take the form of source code, object code, or intermediate code between source code and object code, such as a partly compiled form, or any other desirable form.

The invention also pertains to a computer-readable recording medium on which is recorded a computer program, this program including instructions suitable for the implementation of the method for coding or the method for decoding according to the invention, as described above.

The information medium can be any entity or device capable of storing the program. For example, the medium can include a storage means, such as a ROM, for example a CD ROM or a microelectronic circuit ROM, or else a magnetic recording means, for example a diskette (floppy disc) or a hard disk.

Additionally, the information medium can be a transmissible medium such as an electrical or optical signal, which can be transported via an electrical or optical cable, by radio or by other means. The program according to the invention can in particular be downloaded on an Internet-type network.

Alternatively, the information medium can be an integrated circuit in which the program is incorporated, the circuit being suitable for executing or for being used in the execution of the method in question.

The decoding device and the aforementioned corresponding computer program have at least the same advantages as those conferred by the decoding method according to the present invention.

The coding device and the aforementioned corresponding computer program have at least the same advantages as those conferred by the coding method according to the present invention.

BRIEF DESCRIPTION OF THE DRAWINGS

Other features and advantages will become apparent upon reading about the preferred embodiments described with reference to the figures in which.

DETAILED DESCRIPTION OF THE GENERAL PRINCIPLE OF THE INVENTION

An embodiment of the invention will now be described, in which the coding method according to the invention is used to code a sequence of images as a binary stream close to that obtained by coding according to the H.264/MPEG-4 AVC standard. In this embodiment, the coding method according to the invention is for example implemented in software or hardware by modifications of a coder initially in accordance with the standard H.264/MPEG-4 AVC. The coding method according to the invention is represented in the form of an algorithm including steps C1 to C11, represented in FIG. 1.

Figure 2:
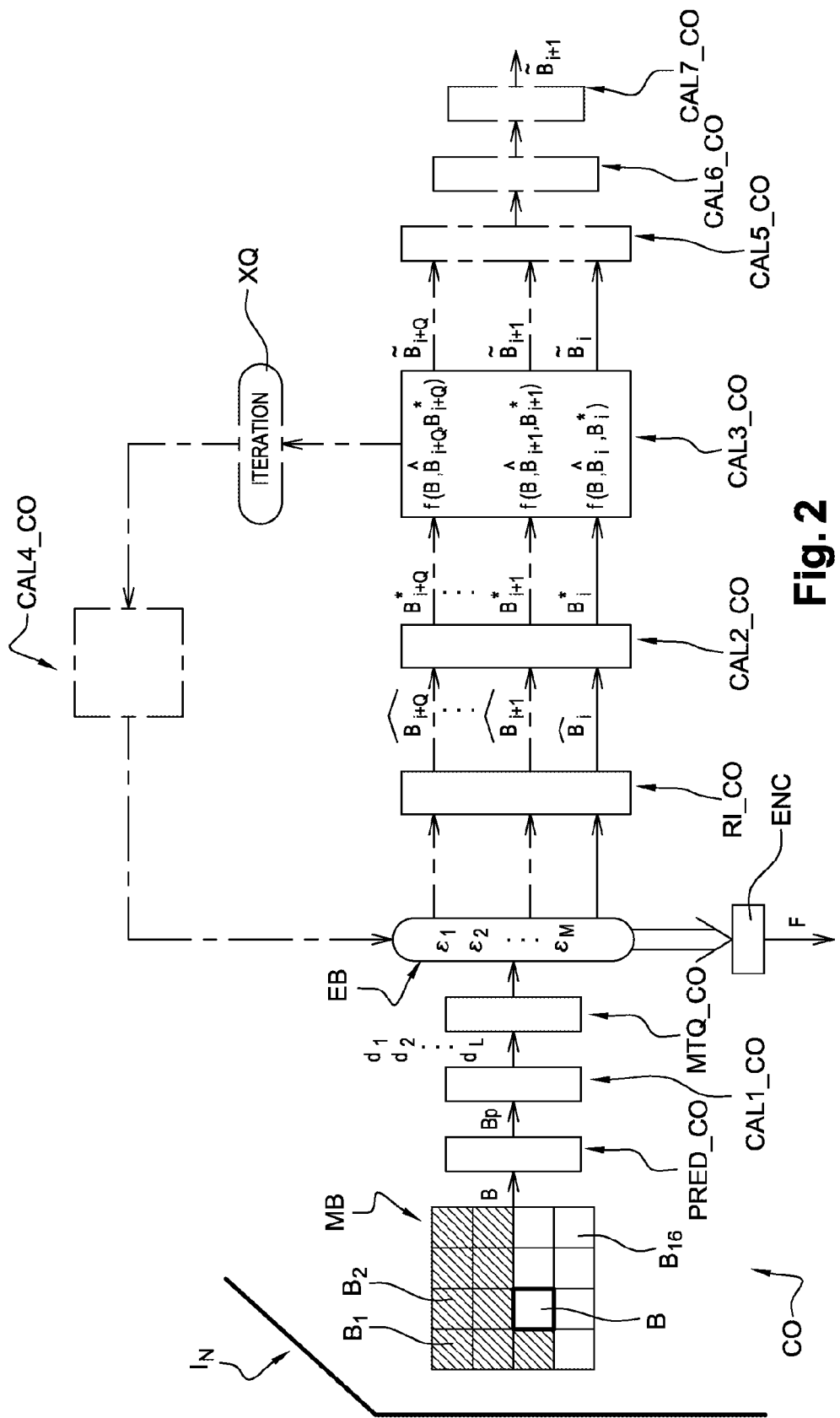
FIG. 2 represents an embodiment of a coding device according to the invention.

According to the embodiment of the invention, the coding method according to the invention is implemented in a coding device CO represented in FIG. 2.

Figure 1:
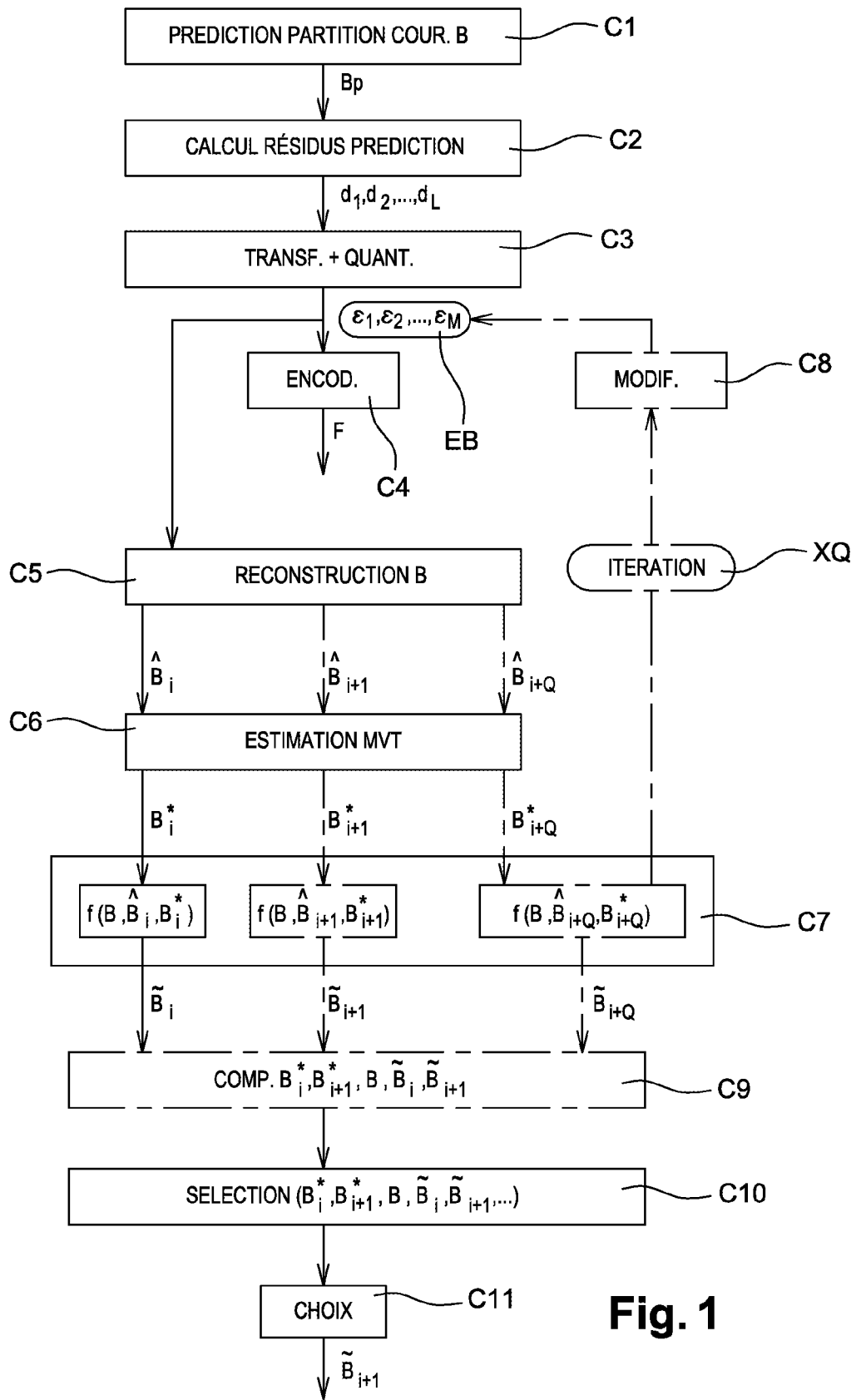
FIG. 1 represents steps of the coding method according to the invention.

During a step C1 represented in FIG. 1, in a manner known per se, there occurs, the prediction of a current partition, denoted B in FIG. 2, from at least one causal partition sought from among a plurality of available causal partitions, i.e. a previously coded then decoded partition. As represented in FIG. 2, the partition B belongs to a current macroblock MB of an image $I_N$ which has previously been split up into a plurality of partitions.

It should be noted that in the sense of the invention, the term "partition" signifies a coding unit. The latter terminology is notably used in the HEVC/H.265 standard, for example in the document that can be accessed at the following internet address: http://phenix.int-evry.frict/doc_en-d_user/current_document.php?id=3286

In particular, such a coding unit groups together sets of pixels of rectangular or square shape, also called blocks, macroblocks, or else sets of pixels having other geometrical shapes.

The prediction implemented in step C1 is in accordance with a mode of prediction that is determined at the coder, such as for example an Intra mode or else an Inter mode, by means of a software calculation sub-module PRED_CO, represented in FIG. 2.

In a manner known per se and by way of non-limiting example, the prediction step C1 consists, for example in Inter mode, in seeking a plurality of candidate causal partitions. The search method is for example based on the correlations between the candidate causal partitions and the current partition B to be reconstructed. The candidate causal partitions are selected for example as a function of a minimization of a sum of squared differences or a sum of absolute differences between a candidate causal partition under consideration and the current partition B. The causal partition of which the minimization of the sum of squared differences or of the sum of absolute differences is the highest is then selected to predict the current partition B to be reconstructed.

At the outcome of step C1, a predicted current partition Bp is obtained.

During a step C2 represented in FIG. 1, a first software calculation module CAL1_CO, represented in FIG. 2, determines a set of residuals $d_1, d_2, \ldots, d_L$ by comparison of the data relating to the current partition B with the data relating to the predicted current partition obtained Bp.

During a step C3 represented in FIG. 1, said determined residuals are sent to a transform and quantization module MTQ_CO represented in FIG. 2, to undergo a transform, for example a discrete cosine transform, then a quantization.

It is supposed that for the predicted current partition Bp, a set EB of M transformed and quantized residual data are obtained at the outcome of step C3. Such transformed and quantized residual data are coefficients denoted for example $\epsilon_1, \epsilon_2, \ldots, \epsilon_M$.

During a step C4, the encoding is performed of all the coefficients $\epsilon_1, \epsilon_2, \ldots, \epsilon_M$, in the same way as in the state of the art.

A data signal F is then delivered at the outcome of step C4.

Such an encoding is performed by an encoder ENC as represented in FIG. 2. Such an encoder is for example in accordance with the H.264/MPEG-4 AVC standard.

During a step C5, the current partition B is then reconstructed by addition, to the predicted current partition Bp, of the coefficients $\epsilon_1, \epsilon_2, \ldots, \epsilon_M$. Such a step is implemented by means of a software reconstruction module RI_CO in accordance with the H.264/MPEG-AVC standard. Such a reconstruction module is represented in FIG. 2.

At the outcome of step C5, a reconstructed current partition $\hat{B}_i$ is obtained, where i is an integer greater than or equal to 0.

In accordance with the invention, during a step C6 represented in FIG. 1, the determination is carried out of at least one already coded then decoded causal partition $B^*_i$, using a motion estimation applied to the reconstructed partition $\hat{B}_i$. Various examples of motion estimation will be described subsequently in the description. Such a step is implemented by a second software calculation module CAL2_CO as represented in FIG. 2.

The step C6 is followed by a step C7 represented in FIG. 1, during which the modification is carried out of said reconstructed current partition $\hat{B}_i$ by calculation of a function f applied at least both to said determined causal partition $B^*_i$ and to said reconstructed current partition $\hat{B}_i$. Such a step is implemented by a third software calculation module CAL3_CO, as represented in FIG. 2, that selects in a database (not represented) of the coder CO the function the best adapted to the respective contents of at least the determined causal partition $B^*_i$ and said reconstructed current partition $\hat{B}_i$.

In the example represented in FIGS. 1 and 2, the function f is applied both to the current partition B, to the determined causal partition $B_i^*$ and to the reconstructed current partition $\hat{B}_i$.

According to a first exemplary embodiment, such a function consists for example in taking an average of the first pixel of the determined causal partition $B^*_i$ and the first pixel of the reconstructed current partition then of the second pixel of the determined causal partition $B^*_i$ and the second reconstructed current partition $\hat{B}_i$, and so on until the last pixel of the determined causal partition $B^*_i$ and of the reconstructed current partition $\hat{B}_i$.

As a variant, such an average can be taken over a plurality of P (P≥2) corresponding pixels. For example, the function can consist in taking an average of the two first pixels of the determined causal partition $B^*_i$, and the two first corresponding pixels of the reconstructed current partition $\hat{B}_i$, then of the two following pixels of the determined causal partition $B^*_i$, and the two following corresponding pixels of the reconstructed current partition $\hat{B}_i$ and so on until the two last pixels of the determined causal partition $B^*_i$ and the two last corresponding pixels of the reconstructed current partition $\hat{B}_i$.

According to a second embodiment, the function takes into account only part of the pixels of the causal partition $B^*_i$ and only part of the corresponding pixels of the reconstructed current partition $\hat{B}_i$. With this aim, a comparison is made between the matrix of residual data $\epsilon_1, \epsilon_2, \ldots, \epsilon_M$ having served in the reconstruction of the current partition B and the matrix of residual data $\epsilon^*_1, \epsilon^*_2, \ldots, \epsilon^*_P$ having served in the reconstruction of the causal partition $B^*_i$.

At the outcome of step C7, a modified reconstructed current partition $\tilde{B}_i$ is obtained. Such a partition consists advantageously in a refinement of the reconstructed partition $\hat{B}_i$ in terms of texture.

According to an optional embodiment, which for this reason is represented in broken lines in FIGS. 1 and 2, the coding method implements the following additional steps.

During a step C8 represented in FIG. 1, there occurs a modification of the set EB of residual data $\epsilon_1, \epsilon_2, \ldots, \epsilon_M$. Such a modification consists for example either in setting to 0 one or a plurality of said residual data $\epsilon_1, \epsilon_2, \ldots, \epsilon_M$, or in modifying to a non-zero value the value of one or a plurality of said residual data $\epsilon_1, \epsilon_2, \ldots, \epsilon_M$. Said step C8 is implemented by a fourth software calculation module CAL4_CO represented in FIG. 2.

The reconstruction step C5 is implemented again based on said modified set of residual data. A new reconstructed partition $\hat{B}_{i+1}$ is then delivered at the outcome of this step.

The step C6 of determination of the causal partition is then implemented again, a new already coded then decoded causal partition $B^*_{i+1}$ being then determined using a motion estimation applied to the new reconstructed current partition $\hat{B}_{i+1}$.

The step C7 of modification of the partition is then implemented again relative to the new reconstructed current partition $\hat{B}_{i+1}$ by calculation of a function applied both to said new determined causal partition $B^*_{i+1}$ and to said new reconstructed current partition $\hat{B}_{i+1}$ delivering a new modified reconstructed current partition $\tilde{B}_{i+1}$.

During a step C9 represented in FIG. 1, there occurs a comparison, according to a predetermined criterion of similarity, between at last two partitions chosen from among the determined causal partition $B^*_i$, the new determined causal partition $B^*_{i+1}$, the current partition B, the modified reconstructed current partition $\tilde{B}_i$, and the new modified reconstructed current partition $\tilde{B}_{i+1}$. Said step C9 is implemented by a fifth software calculation module CAL5_CO represented in FIG. 2.

According to a first embodiment, such a criterion of similarity can consist in performing a correlation between the current partition B, the determined causal partition $B^*_i$, the new determined causal partition $B^*_{i+1}$, the modified reconstructed current partition $\tilde{B}_i$, and the new modified reconstructed current partition $\tilde{B}_{i+1}$. In a manner known per se, such a correlation consists for example in calculating the sum of squared differences or the sum of absolute differences:

between each first pixel of the current partition B, of the determined causal partition $B^*_i$, of the new determined causal partition $B^*_{i+1}$, of the modified reconstructed current partition $\tilde{B}_i$, and of the new modified reconstructed current partition $\tilde{B}_{i+1}$, then between each second pixel of the current partition B, of the determined causal partition $B^*_i$, of the new determined causal partition $B^*_{i+1}$, of the modified reconstructed current partition $\tilde{B}_i$, and of the new modified reconstructed current partition $\tilde{B}_{i+1}$, and so on until the last pixel of each of said partitions under consideration.

As a variant, such a calculation can be performed on the P first pixels of each of said aforementioned partitions, P being an integer, such that P≥2.

According to a second embodiment, such a criterion of similarity can consist in evaluating the distortion between the current partition B, the determined causal partition $B^*_i$, the new determined causal partition $B^*_{i+1}$, the modified reconstructed current partition $\tilde{B}_i$, and the new modified reconstructed current partition $\tilde{B}_{i+1}$.

According to a third embodiment, such a criterion of similarity can consist in evaluating the difference in cost in bits of the coding of the current partition B, of the determined causal partition $B^*_i$, of the new determined causal partition $B^*_{i+1}$ of the modified reconstructed current partition $\tilde{B}_i$, and of the new modified reconstructed current partition $\tilde{B}_{i+1}$.

During a step C10 represented in FIG. 1, there occurs a selection of one or a plurality of compared partitions which respond the best to the criterion of similarity. Said step C10 is implemented by a sixth software calculation module CAL6_CO represented in FIG. 2.

In the case where the criterion of similarity is in accordance with the first embodiment, are retained only the partitions for which the sum of squared differences or sum of absolute differences that has been calculated is less than a predetermined threshold.

In the case where the criterion of similarity is in accordance with the second embodiment, are retained only the partitions for which the distortion that has been evaluated is less than a predetermined threshold.

In the case where the criterion of similarity is in accordance with the third embodiment, are retained only the partitions for which the cost in coding bits that has been calculated is less than a predetermined threshold.

In the case where a plurality of the compared partitions have been selected, there occurs, during a step C11 represented in FIG. 1, the choice of a partition, according to a predetermined criterion of coding performance, such as for example the bitrate-distortion criterion well known to the person skilled in the art. Such a criterion is expressed by equation (1) below:

$$J=D+\lambda R \text{ where} \qquad (1)$$

D represents the distortion between the original partition and the reconstructed partition, R represents the cost in coding bits of the coding parameters and $\lambda$ represents a Lagrange multiplier.

Said step C11 is implemented by a seventh software calculation module CAL7_CO represented in FIG. 2.

In the example represented, it is the modified reconstructed partition $\tilde{B}_{i+1}$ that is chosen.

Taking this choice into account, these are the modified residual data at the outcome of the aforementioned step C8 that are finally encoded in the data signal F. The signalling cost is therefore advantageously reduced by this.

As represented in FIGS. 1 and 2, the successive sequence of steps C8, C5, C6, C7, C9, C10, C11, C4 can be iterated Q times so as to optimize the reduction of the signalling cost without degrading the quality of the reconstruction of the current partition B.

The coding method that has just been described above is of course implemented for each of the partitions of the current macroblock MB that follow the current partition B.

Figure 3:
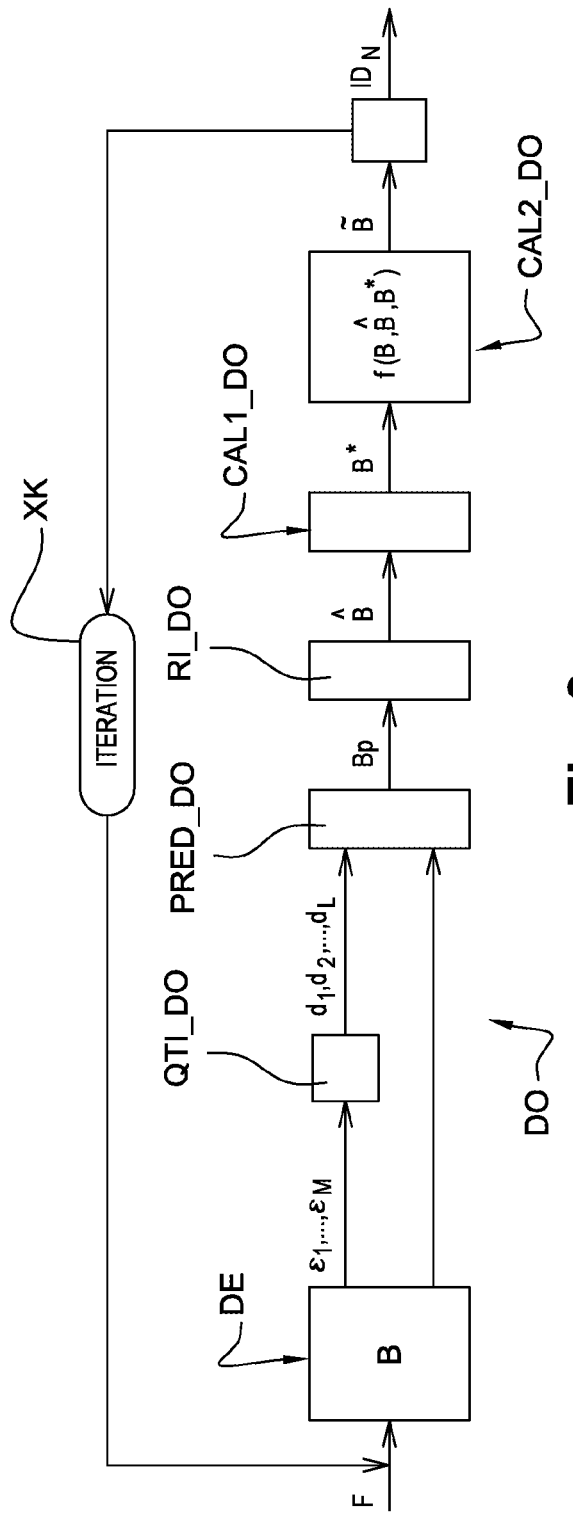
FIG. 3 represents an embodiment of a decoding device according to the invention.

The data signal F is then transmitted by means of a transmission interface (not represented) of the coder CO, via a communications network, to a remote terminal. The latter includes a decoder DO as represented in FIG. 3. The decoder DO then implements steps D1 to D6 of the decoding method according to the invention, as represented in FIG. 4.

Such a decoding method according to the invention is also implemented in a software or hardware manner by modification of a decoder initially in accordance with the H.264/MPEG-4 AVC standard.

The signal F is first sent to a software module for entropic decoding DE represented in FIG. 3. The latter performs, during a step D1 represented in FIG. 4, an inverse decoding from that performed by the encoder ENC represented in FIG. 2.

Figure 4:
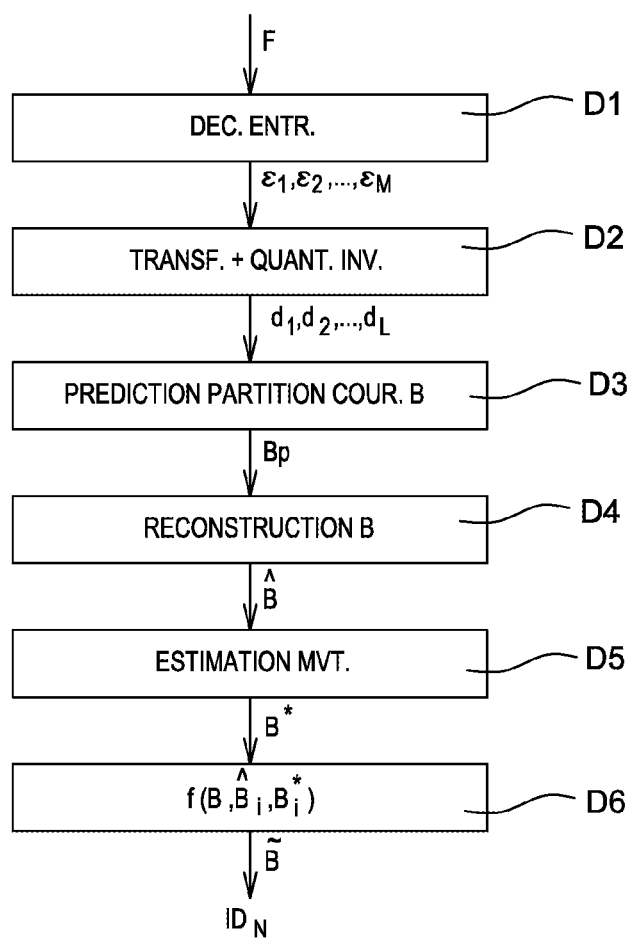
FIG. 4 represents steps of the decoding method according to the invention.

Then, for a current partition B to be reconstructed, the decoded coefficients $\epsilon_1, \epsilon_2, \ldots, \epsilon_M$, if they exist, are sent to an inverse quantization and inverse transform module QTI_DO which, during a step D2 represented in FIG. 4, delivers the residuals $d_1, d_2, \ldots, d_L$ obtained in the aforementioned coding step C2.

During a step D3 represented in FIG. 4, there occurs the prediction of the current partition B to be reconstructed from at least one already decoded causal partition B'. Such a step is conventionally performed by a software prediction submodule PRED_DO represented in FIG. 3.

The prediction type to be used is either read in the data signal F, or reproduced in the decoder.

In a manner known per se and by way of non-limiting example, the prediction step D3 consists in searching for a plurality of candidate causal partitions $B^r_1, B^r_2, \ldots, B^r_c, \ldots, B^r_C$ (c being an integer such that $1 \leq c \leq C$). The search method is for example based on the correlations between the candidate causal partitions and the current partition B to be reconstructed. The candidate causal partitions are selected for example as a function of a minimization of a sum of squared differences or a sum of absolute differences between a candidate causal partition under consideration and the current partition B. The causal partition $B^r_c$ the minimization of the sum of absolute or squared differences of which is the highest is then selected to predict the current partition B to be reconstructed. At the outcome of step D3, a predicted current partition Bp is obtained.

During a step D4, the current partition B is then reconstructed by addition, to the predicted current partition Bp, and, if they exist, the residual data $d_1, d_2, \ldots, d_L$ delivered by the inverse quantization and inverse transform module QTI_DO, as represented in FIG. 3. Such a step is implemented by means of a software reconstruction module RI DO in accordance with the H.264/MPEG-AVC standard.

At the outcome of step D4, a reconstructed current partition $\hat{B}$ is obtained.

In accordance with the invention, during a step D5 represented in FIG. 4, the determination is carried out of at least one already decoded causal partition B* using a motion estimation applied to the reconstructed partition $\hat{B}$. Various examples of motion estimation will be described later in the description. Such a step is implemented by a first software calculation module CAL1_DO as represented in FIG. 3.

The step D5 is followed by a step D6 represented in FIG. 4, during which a modification is carried out of said reconstructed current partition $\hat{B}$ by calculation of a function applied both to said determined causal partition B* and to said reconstructed current partition $\hat{B}$. Such a step is implemented by a second software calculation module CAL2_DO as represented in FIG. 3, which selects in a database (not represented) of the decoder DO the function the best adapted to the respective contents of the determined causal partition B* and of said reconstructed current partition $\hat{B}$.

In the example represented in FIGS. 3 and 4, the function f is applied both to the current partition B, to the determined causal partition B* and to the reconstructed current partition $\hat{B}$.

According to a first embodiment, such a function consists for example in taking an average of the first pixel of the determined causal partition B* and the first pixel of the reconstructed current partition $\hat{B}$, then of the second pixel of the determined causal partition B* and the second pixel of the reconstructed current partition $\hat{B}$, and so on until the last pixel of the determined causal partition B* and of the reconstructed current partition $\hat{B}$.

As a variant, such an average can be taken over a plurality P ($P \geq 2$) of corresponding pixels. For example, the function can consist in taking an average of the two first pixels of the determined causal partition B* and the two first corresponding pixels of the reconstructed current partition $\hat{B}$, then of the two following pixels of the determined causal partition B* and the two following corresponding pixels of the reconstructed current partition $\hat{B}$, and so on up to the last two pixels of the determined causal partition B* and up to the last two corresponding pixels of the reconstructed current partition $\tilde{B}$.

According to a second embodiment, the function only takes into account part of the pixels of the causal partition B* and only part of the corresponding pixels of the reconstructed current partition $\hat{B}$. With this aim, a comparison is made between the matrix of the residual data $\epsilon_1, \epsilon_2, \ldots, \epsilon_M$ having served in the reconstruction of the current partition B and the matrix of residual data $\epsilon^*_1, \epsilon^*_2, \ldots, \epsilon^*_P$ having served in the reconstruction of the causal partition B*.

At the outcome of the step D6, a modified reconstructed current partition $\tilde{B}$ is obtained. Such a partition consists advantageously in a refinement of the reconstructed partition $\hat{B}$ in terms of texture.

Once all the partitions of the image $I_N$ have been decoded by refinement according to the decoding method that has just been described, there is provided, at the output of the decoder DO, an image $ID_N$ corresponding to the decoding of the image $I_N$, as is represented in FIGS. 3 and 4.

With reference now to FIGS. 5A to 5D, several embodiments for implementing, during coding or during decoding, the step of determination of at least one causal partition $B^*_i$ or B* will now be described.

Figure 5A:
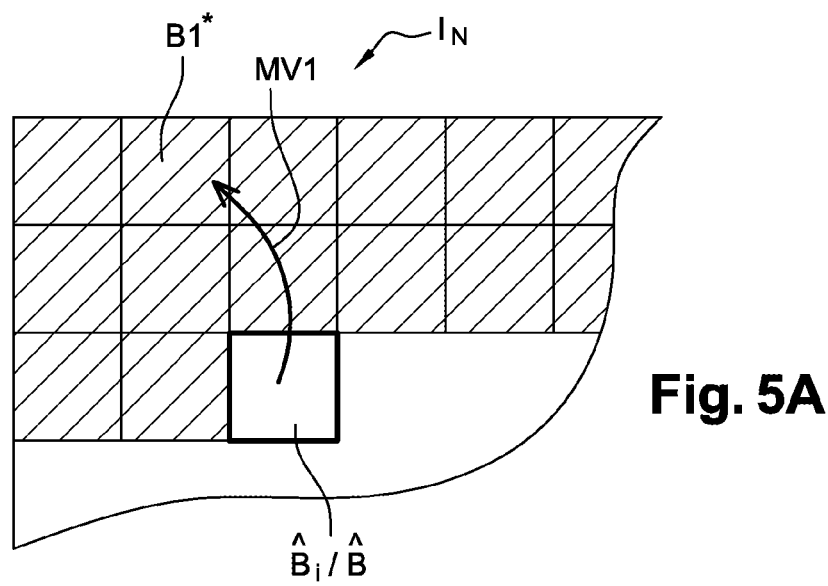
FIGS. 5A to 5D represent examples of motion estimation applied to the reconstructed current partition.

According to the example represented in FIG. 5A, the image $I_N$ is a two-dimensional image. The step C6 or D5 of determination of a causal partition consists in searching, in a part of the current image $I_N$ which has already been decoded, said part being represented by hatching in FIG. 5A, for the causal partition B1* pointed to by a motion vector MV1 associated with the reconstructed partition $\hat{B}_i$ or $\hat{B}$, which vector has for example been selected by competition by the module CAL2_CO of the coder or the calculation module CAL1_DO of the decoder, from among a plurality of candidate motion vectors. According to this example, the motion estimation is here performed in Intra.

Figure 5B:
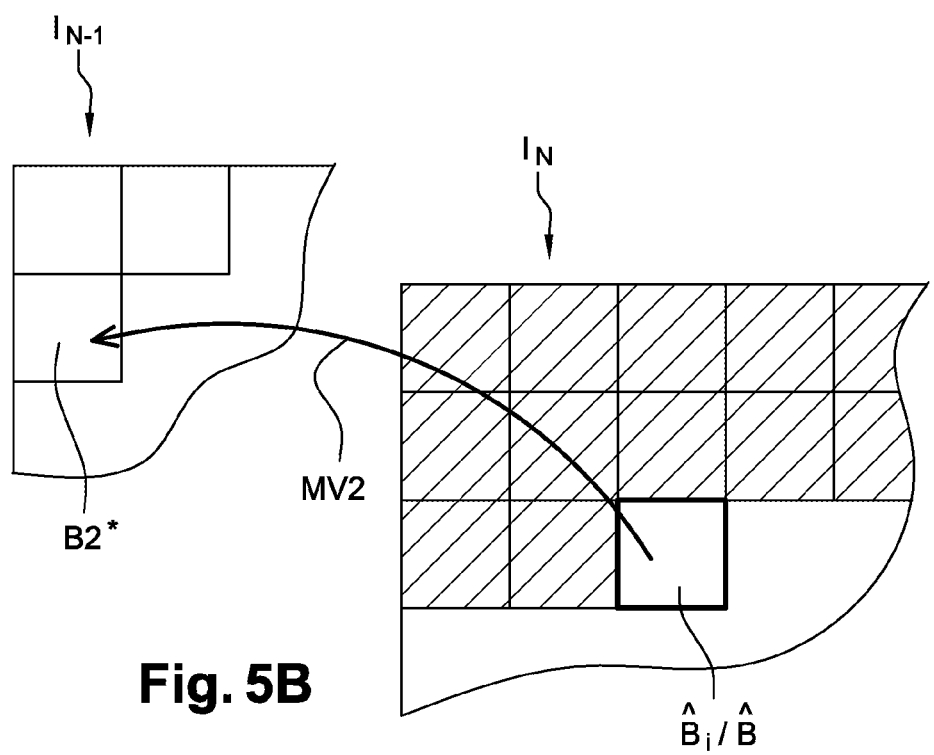

According to the example represented in FIG. 5B, the image $I_N$ is still a two-dimensional image. The step C6 or D5 of determination of a causal partition consists in searching, in an image that has already been decoded, such as for example the image $I_{N-1}$ immediately preceding the current image $I_N$, for the causal partition B2* pointed to by a motion vector MV2 associated with the reconstructed partition $\hat{B}_i$ or $\hat{B}$, which vector has for example been selected by competition by the module CAL2_CO of the coder or the calculation module CAL1_DO of the decoder, from among a plurality of candidate motion vectors. According to this example, the motion estimation is here performed in Inter.

Figure 5C:
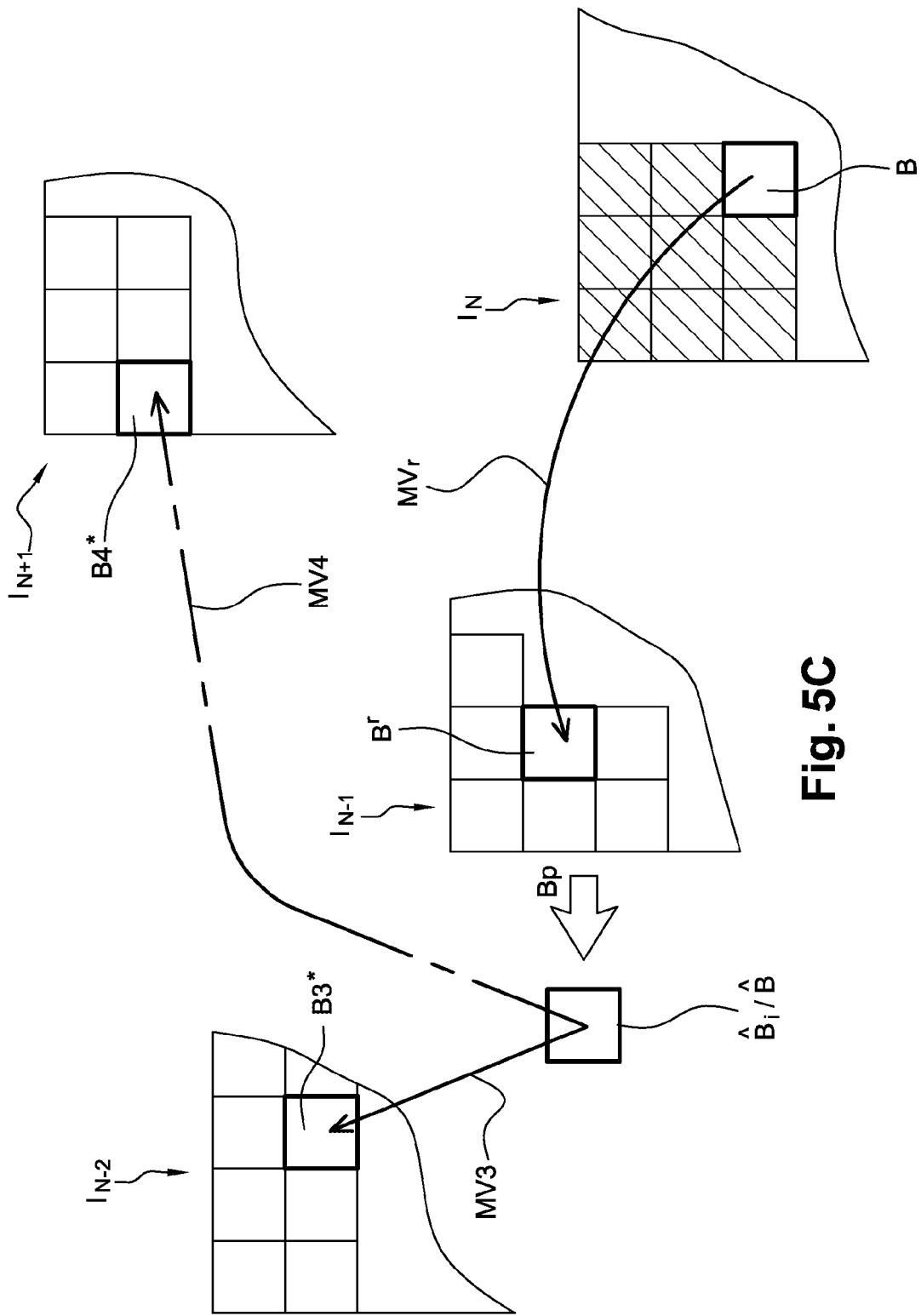

According to the example represented in FIG. 5C, the image $I_N$ is still a two-dimensional image. Prior to the step of determination of the causal partition, the step C1 or D3 of prediction of the current partition B consists in a prediction of Inter type, during which the search is carried out in an image that has already been decoded, such as for example the image $I_{N-1}$ immediately preceding the current image $I_N$, of an already decoded causal partition $B^r$ pointed to by a motion vector MVr associated with the current partition B. On decoding, the vector MVr is either read in the data signal F transmitted to the decoder DO, or calculated by the latter. A predicted current partition Bp is then obtained. Then the step C5 or D4 of reconstruction of said current partition is implemented as described above so as to deliver a reconstructed partition $\hat{B}_i$ or $\hat{B}$, respectively.

The step C6 or D5 of determination of a causal partition then consists in searching, in an image that has already been decoded, such as for example the image $I_{N-2}$ immediately preceding the image $I_{N-1}$, for the causal partition B3* pointed to by a motion vector MV3 associated with the reconstructed partition $\hat{B}_i$ or $\hat{B}$, which vector has for example been selected by competition by the module CAL2_CO of the coder or the calculation module CAL1_DO of the decoder, from among a plurality of candidate motion vectors.

By way of alternative represented in dotted lines in FIG. 5C, the step C6 or D5 of determination of a causal partition consists in searching, in an image that has already been decoded, such as for example the image $I_{N+1}$ immediately following the current image $I_N$, for the casual partition B4* pointed to by a motion vector MV4 associated with the reconstructed partition $\hat{B}_i$ or $\hat{B}$, which vector has for example been selected by competition by the module CAL2_CO of the coder or the calculation module CAL1_DO of the decoder, from among a plurality of candidate motion vectors.

Such an arrangement makes it possible to improve the motion compensation applied to the reconstructed current partition, since it uses two motion parameters instead of one: the motion vector MVr used to predict the current partition B and the motion vector MV3 or MV4 used to determine the casual partition B*3 or B*4, respectively.

Furthermore, at the decoding, such an arrangement offers the advantage of not leading to any increase in the signalling cost, since the motion vector MV3 or MV4 is calculated upon decoding, and not transmitted in the data signal F.

Figure 5D:
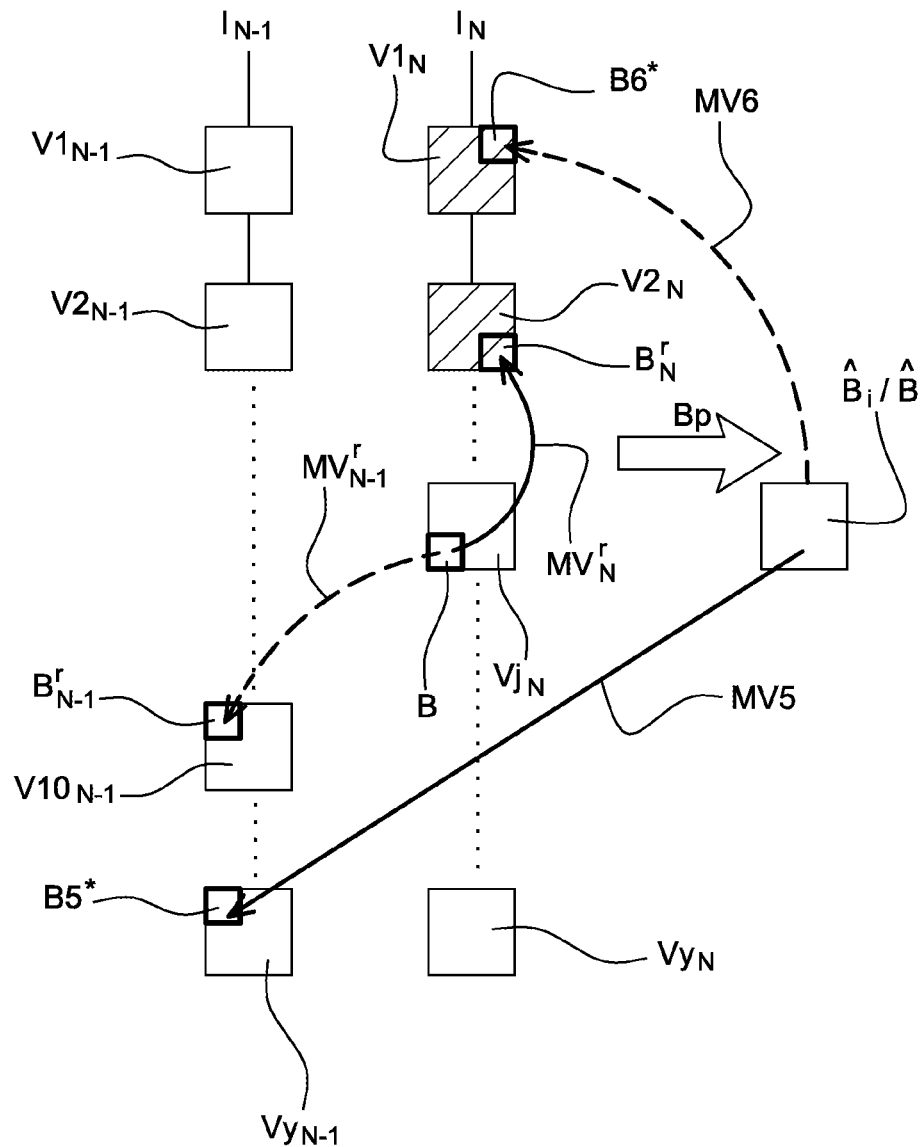

According to the example represented in FIG. 5D, the image $I_N$ is a three-dimensional image that has been coded for example in accordance with the MVC standard. With this aim, the current image $I_N$ comprises a plurality of views $V1_N, V2_N, \ldots, Vy_N$ respectively representing one and the same scene.

Prior to the step C6 or D5 of determination of a causal partition, the step C1 or D3 of prediction of the current partition B belonging to a current view $Vj_N$ of the current image $I_N$ consists in a prediction of Inter type, during which the search is carried out in an already decoded view of the current image $I_N$, such as for example the view $V2_N$, of an already decoded causal partition $B^r_N$ pointed to by a motion vector $MV^r_N$ associated with the current partition B. On decoding, the vector $MV^r_N$ is either read in the data signal F transmitted to the decoder DO, or calculated by the latter. A predicted current partition Bp is then obtained. Then the step C5 or D4 of reconstruction of said current partition is implemented as described above so as to deliver a reconstructed partition $\hat{B}_i$ or $\hat{B}$, respectively.

The step C6 or D5 of determination of a causal partition then consists in searching, in a view of an image that has already been decoded, such as for example the view $Vy_{N-1}$ of the image $I_{N-1}$ immediately preceding the current image $I_N$, for the casual partition B5* pointed to by a motion vector MV5 associated with the reconstructed partition $\hat{B}_i$ or $\hat{B}$, which vector has for example been selected by competition by the module CAL2_CO of the coder or of the calculation module CAL1_DO of the decoder, from among a plurality of candidate motion vectors.

By way of alternative represented in dotted lines in FIG. 5D, prior to the step C6 or D5 of determination of a causal partition, the step C1 or D3 of prediction of the current partition B belonging to a current view $Vj_N$ of the current image $I_N$ consists in a prediction of Inter type, during which the search is carried out in a view of an image that has already been decoded, such as for example the view $V10_{N-1}$ of the image $I_{N-1}$ immediately preceding the current image $I_N$, of an already decoded causal partition $B^r_{N-1}$ pointed to by a motion vector $MV^r_{N-1}$ associated with the current partition B. On decoding, the vector $MV^r_{N-1}$ is either read in the data signal F transmitted to the decoder DO, or calculated by the latter. A predicted current partition Bp is then obtained. Then the step C5 or D4 of reconstruction of said current partition is implemented as described above, so as to deliver a reconstructed partition $\hat{B}_i$ or $\hat{B}$, respectively.

The step C6 or D5 of determination of a causal partition then consists in searching, in an already decoded view of the image courante $I_N$, such as for example the view $V1_N$ de the image courante $I_N$, for the causal partition B6* pointed to by a motion vector MV6 associated with the reconstructed partition $\hat{B}_i$ or $\hat{B}$, which vector has for example been selected been selected by competition by the module CAL2_CO of the coder or of the calculation module CAL1_DO of the decoder, from among a plurality of candidate motion vectors.

It goes without saying the embodiments that have been described above have been given purely by way of information and are in no way limiting, and that many modifications can be easily contributed by the person skilled in the art without for all this departing from the scope of the invention.

The invention claimed is:

1. A method for decoding a data signal representing at least one current image split up into partitions, said method comprising, for at least one current partition to be reconstructed in said image, the following acts performed by a decoding device:
   reading in the data signal of coded data associated to said at least one current partition,
   decoding any residual data of the coded data that results from a prediction of the current image at coding, said residual data belonging to a set of residual data which have been obtained at coding following a prediction by comparison of data relating to a current partition to be coded and to a predicted current partition,
   prediction of said current partition by searching at least one first already decoded causal partition from among a plurality of available decoded causal partitions with a given mode of prediction that is either read in the data signal or determined by the decoding device, delivering a predicted current partition,
   reconstruction of said current partition, by addition to said predicted current partition and any of said decoded residual data, delivering a reconstructed current partition, and
   following said reconstruction act, implementing acts of:
      determination of at least one second already decoded causal partition using a motion estimation applied to said reconstructed current partition, wherein in the case where the current image comprises a plurality of views representing one and the same scene respectively, said at least one second already decoded causal partition is sought in an already decoded view of said current image or in another already decoded image, and
      modification of said reconstructed current partition by calculation of a function applied both to said at least one second already decoded causal partition and to said reconstructed current partition, delivering a modified reconstructed current partition.

2. The decoding method as claimed in claim 1, during which said function is applied to all the pixels or else to a sub-set of said pixels of the at least one second already decoded causal partition and to all the corresponding pixels respectively or else to a sub-set of said corresponding pixels of said reconstructed current partition.

3. The decoding method as claimed in claim 1, during which said at least one second already decoded causal partition is sought in a decoded part of the current image or else in another image having already been decoded.

4. The decoding method as claimed in claim 3, said other already decoded image being an earlier or later image than the current image.

5. A method for coding at least one image split up into partitions, implementing, for a current partition to be coded, the following acts performed by a coding device:
   prediction of said current partition by searching at least one first already coded then decoded causal partition from among a plurality of available coded then decoded causal partitions, delivering a predicted current partition, and during which a set of residual data is obtained following said prediction by comparison of data relating to the current partition and to said predicted current partition,
   reconstruction of said current partition from said predicted current partition, delivering a reconstructed current partition, and
   following said reconstruction act, implementing acts of:
   determination of at least one second already coded then decoded causal partition using a motion estimation applied to said reconstructed current partition,
   modification of said reconstructed current partition by calculation of a function applied both to said at least one second already coded then decoded causal partition and to said reconstructed current partition, delivering a modified reconstructed current partition; and
   implementing the following acts, after the delivering the modified reconstructed current partition:
      modification of at least one of said residual data of said set, delivering a modified set of residual data,
      reconstruction of said current partition from said predicted current partition and from said modified set of residual data, delivering a new reconstructed current partition,
      determination of at least one new already coded then decoded causal partition using a motion estimation applied to said new reconstructed current partition,
      modification of said new reconstructed current partition by calculation of a function applied both to said new determined causal partition and to said new reconstructed current partition, delivering a new modified reconstructed current partition,
      comparison, according to a predetermined criterion of similarity, between at least two partitions chosen from among said at least one second already coded then decoded causal partition, said new determined causal partition, the current partition, the modified reconstructed current partition, and the new modified reconstructed current partition.

6. The coding method as claimed in claim 5, implementing, following said comparison act, the following acts:
   at least one iteration of said acts of modification of at least one of said residual data, of reconstruction of said current partition, of determination of at least one new causal partition, of modification of a new reconstructed partition, and of comparison of partitions,
   selection of a plurality of partitions that best meet the criterion of similarity,
   choice of a partition from among said plurality of selected partitions, according to a predetermined criterion of coding performance.

7. A device for decoding a data signal representing at least one image split up into partitions, comprising, for at least one current partition to be reconstructed in said image:
- means for reading in the data signal of coded data associated to said at least one current partition,
- means for decoding any residual data of said coded data that results from a prediction of the current partition at coding, said residual data belonging to a set of residual data which have been obtained at coding following a prediction by comparison of data relating to a current partition to be coded and to a predicted current partition,
- means for predicting said current partition by searching at least one first already decoded causal partition from among a plurality of available decoded causal partitions with a given mode of prediction that is either read in the data signal or determined by the decoding device, delivering a predicted current partition,
- means for reconstructing said current partition by addition to said predicted current partition and any of said decoded residual data, delivering a reconstructed current partition,
- means for determining at least one second already decoded causal partition using a motion estimation applied to said reconstructed current partition, wherein in the case where the current image comprises a plurality of views representing one and the same scene respectively, said at least one second already decoded causal partition is sought in an already decoded view of said current image or in another already decoded image, and
- means for modifying said reconstructed current partition by calculation of a function applied both to said at least one second already decoded causal partition and to said reconstructed current partition, delivering a modified reconstructed current partition.

8. A device for coding at least one image split up into partitions, comprising, for a current partition to be coded:
- means for predicting said current partition by searching at least one first already coded then decoded causal partition from among a plurality of available coded then decoded causal partitions, delivering a predicted current partition, during which a set of residual data is obtained following said prediction by comparison of data relating to the current partition and to said predicted current partition,
- means for reconstructing said current partition from said predicted current partition, delivering a reconstructed current partition,
- means for determining at least one second already coded then decoded causal partition using a motion estimation applied to said reconstructed current partition,
- means for modifying said reconstructed current partition by calculation of a function applied both to said at least one second already coded then decoded causal partition and to said reconstructed current partition, delivering a modified reconstructed current partition, and
- means for implementing the following acts, after the delivering the modified reconstructed current partition:
  - modification of at least one of said residual data of said set, delivering a modified set of residual data,
  - reconstruction of said current partition from said predicted current partition and from said modified set of residual data, delivering a new reconstructed current partition,
  - determination of at least one new already coded then decoded causal partition using a motion estimation applied to said new reconstructed current partition,
  - modification of said new reconstructed current partition by calculation of a function applied both to said new determined causal partition and to said new reconstructed current partition, delivering a new modified reconstructed current partition, and
  - comparison, according to a predetermined criterion of similarity, between at least two partitions chosen from among said at least one second already coded then decoded causal partition, said new determined causal partition, the current partition, the modified reconstructed current partition, and the new modified reconstructed current partition.

9. A non-transitory computer-readable recording medium on which is recorded a computer program comprising instructions for execution of acts of a decoding method, when said program is executed by a computer, said decoding method comprising decoding a data signal representing at least one current image split up into partitions, wherein decoding comprises, for at least one current partition to be reconstructed in said image, acts of:
- reading in the data signal of coded data associated to said at least one current partition,
- decoding any residual data of the coded data that results from a prediction of the current partition at coding, said residual data belonging to a set of residual data which have been obtained at coding following a prediction by comparison of data relating to a current partition to be coded and to a predicted current partition,
- prediction of said current partition by searching at least one first already decoded causal partition from among a plurality of available decoded causal partitions with a given mode of prediction that is either read in the data signal or determined by the decoding device, delivering a predicted current partition,
- reconstruction of said current partition, by addition to said predicted current partition and any of said decoded residual data, delivering a reconstructed current partition, and
- following said reconstruction act, implementing acts of:
- determination of at least one second already decoded causal partition using a motion estimation applied to said reconstructed current partition, wherein in the case where the current image comprises a plurality of views representing one and the same scene respectively, said at least one second already decoded causal partition is sought in an already decoded view of said current image or in another already decoded image, and
- modification of said reconstructed current partition by calculation of a function applied both to said at least one second already decoded causal partition and to said reconstructed current partition, delivering a modified reconstructed current partition.

10. A non-transitory computer-readable recording medium on which is recorded a computer program comprising instructions for execution of acts of a coding method, when said program is executed by a computer, wherein the coding method comprises coding at least one image split up into partitions, implementing, for a current partition to be coded, acts of:
- prediction of said current partition by searching at least one first already coded then decoded causal partition from among a plurality of available coded then decoded causal partitions, delivering a predicted current partition, and during which a set of residual data is obtained following said prediction by comparison of data relating to the current partition and to said predicted current partition, reconstruction of said current partition from said predicted current partition, delivering a reconstructed current partition, and following said reconstruction act, implementing acts of:

determination of at least one second already coded then decoded causal partition using a motion estimation applied to said reconstructed current partition, modification of said reconstructed current partition by calculation of a function applied both to said at least one second already coded then decoded causal partition and to said reconstructed current partition, delivering a modified reconstructed current partition, and implementing the following acts, after the delivering the modified reconstructed current partition:

modification of at least one of said residual data of said set, delivering a modified set of residual data, reconstruction of said current partition from said predicted current partition and from said modified set of residual data, delivering a new reconstructed current partition, determination of at least one new already coded then decoded causal partition using a motion estimation applied to said new reconstructed current partition, modification of said new reconstructed current partition by calculation of a function applied both to said new determined causal partition and to said new reconstructed current partition, delivering a new modified reconstructed current partition, and comparison, according to a predetermined criterion of similarity, between at least two partitions chosen from among said at least one second already coded then decoded causal partition, said new determined causal partition, the current partition, the modified reconstructed current partition, and the new modified reconstructed current partition.

\* \* \* \* \*